US012682370B2

(12) United States Patent
McDevitt

(10) Patent No.: US 12,682,370 B2
(45) Date of Patent: Jul. 14, 2026

(54) SYSTEM AND METHOD FOR IMPROVED MARKETING COMPENSATION BY RECOGNITION OF NATURAL PROMOTION ELEMENTS IN MEDIA CONTENT

(71) Applicant: John McDevitt, Clearwater, FL (US)

(72) Inventor: John McDevitt, Clearwater, FL (US)

( * ) Notice: Subject to any disclaimer, the term of this patent is extended or adjusted under 35 U.S.C. 154(b) by 228 days.

(21) Appl. No.: 18/372,080

(22) Filed: Sep. 23, 2023

(65) Prior Publication Data

US 2024/0112214 A1     Apr. 4, 2024

Related U.S. Application Data

(60) Provisional application No. 63/377,799, filed on Sep. 30, 2022.

(51) Int. Cl.
| | |
|---|---|
| *G06Q 30/00* | (2023.01) |
| *G06Q 30/0214* | (2023.01) |
| *H04N 21/233* | (2011.01) |
| *H04N 21/234* | (2011.01) |
| *H04N 21/81* | (2011.01) |

(52) U.S. Cl.
CPC ....... *G06Q 30/0214* (2013.01); *H04N 21/233* (2013.01); *H04N 21/23418* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 8,965,965 B2 * | 2/2015 | Kansal | .................... | G06Q 10/10 |
| | | | | 709/204 |
| 2007/0130015 A1 * | 6/2007 | Starr | .................... | H04N 21/858 |
| | | | | 705/14.46 |
| 2008/0154708 A1 * | 6/2008 | Allan | ................. | G06Q 30/0222 |
| | | | | 705/14.23 |
| 2010/0114719 A1 * | 5/2010 | Steelberg | ........... | G06Q 30/0276 |
| | | | | 705/14.72 |
| 2010/0223119 A1 * | 9/2010 | Klish | .................... | G06Q 30/00 |
| | | | | 705/14.26 |

(Continued)

*Primary Examiner* — Christopher Stroud

(57) ABSTRACT

A system and method that provides a process of calculating marketing compensation based on the recognition of consumer consumption of natural promotion elements in media content. Generally, promotion elements included in content appear to be incongruent with the rest of the content, inauthentic, and do not deliver the promotional brand enhancement that is desired. Natural promotion elements in media content are more authentic and offer the desired brand enhancement. The described system and method provide media content creators or media content distribution platforms a process to be compensated for the creator's natural promotional endorsements of brands. The described system and method analyze the media content and its distribution to identify and measure the quality of the included natural promotional elements, the duration of the natural promotional elements, the number of impressions of the media content consumed, and the amount of time the identified natural promotional elements are consumed. Primarily based on these components compensation rates and amounts are calculated for content creators or distribution platforms.

7 Claims, 3 Drawing Sheets

(56)     References Cited

U.S. PATENT DOCUMENTS

| | | | |
|---|---|---|---|
| 2010/0293569 A1* | 11/2010 | Kusumoto | G06Q 30/0213 |
| | | | 725/23 |
| 2011/0258050 A1* | 10/2011 | Chan | G06Q 30/02 |
| | | | 705/14.66 |
| 2013/0018893 A1* | 1/2013 | Nelson | G06Q 30/02 |
| | | | 707/748 |
| 2014/0019264 A1* | 1/2014 | Wachman | G06Q 30/0276 |
| | | | 705/14.72 |
| 2014/0304071 A1* | 10/2014 | Manafy | G06Q 30/0255 |
| | | | 705/14.53 |
| 2015/0245084 A1* | 8/2015 | Downing | G06Q 30/0261 |
| | | | 725/12 |
| 2015/0245103 A1* | 8/2015 | Conte | G06Q 30/0257 |
| | | | 725/60 |
| 2017/0250931 A1* | 8/2017 | Loannou | H04L 51/02 |
| 2017/0323344 A1* | 11/2017 | Nigul | G06Q 30/0269 |
| 2018/0285929 A1* | 10/2018 | Lewis | G06Q 30/0257 |
| 2019/0147471 A1* | 5/2019 | McKelvey, Jr. | G06Q 30/0255 |
| | | | 705/14.1 |
| 2019/0279241 A1* | 9/2019 | DiTomaso | G06F 16/27 |
| 2022/0084151 A1* | 3/2022 | Tripathi | G06Q 50/20 |
| 2022/0215436 A1* | 7/2022 | Volk | G06Q 30/0269 |
| 2022/0277356 A1* | 9/2022 | Russo | G06Q 30/0277 |

* cited by examiner

100

101

102

103

Media Content Business Rules and Goals Engine

Existing Content

New Content

104 — Media Content Library

105

Promotion Request Engine

106 — Media Content Analysis Processor

107 — Media Content Distribution Rules Engine

108 — Media Content Distribution Server

109 — Media Content Distribution Analysis Processor

110 — Compensation Analysis Processor

111 — Results Evaluation Processor

112 — Results for Advertiser

113 — Results for Media Content Creator and Platform

Fig. 1

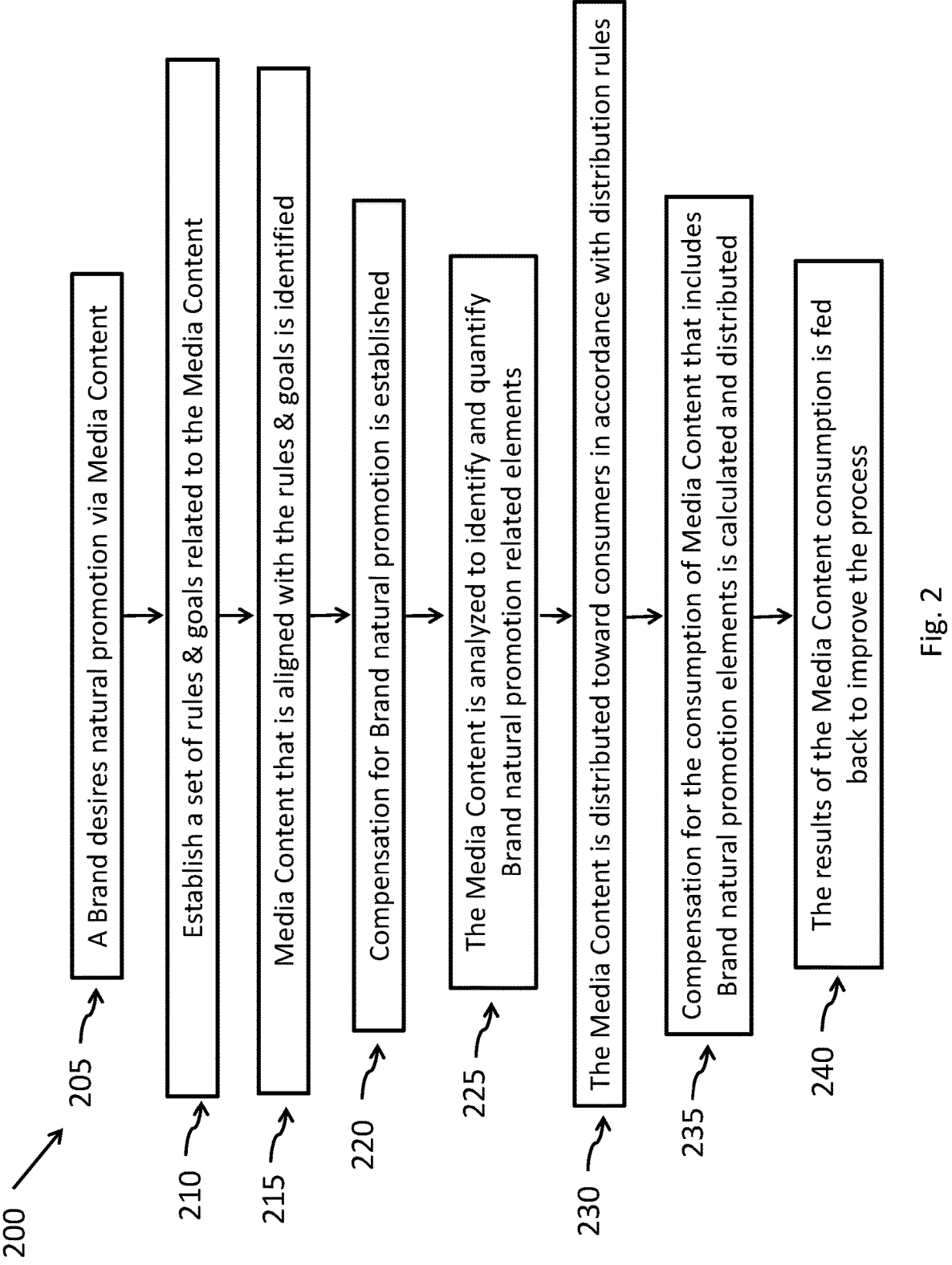

200

205 — A Brand desires natural promotion via Media Content

210 — Establish a set of rules & goals related to the Media Content

215 — Media Content that is aligned with the rules & goals is identified

220 — Compensation for Brand natural promotion is established

225 — The Media Content is analyzed to identify and quantify Brand natural promotion related elements 230 — The Media Content is distributed toward consumers in accordance with distribution rules 235 — Compensation for the consumption of Media Content that includes Brand natural promotion elements is calculated and distributed 240 — The results of the Media Content consumption is fed back to improve the process

Fig. 2

SYSTEM AND METHOD FOR IMPROVED MARKETING COMPENSATION BY RECOGNITION OF NATURAL PROMOTION ELEMENTS IN MEDIA CONTENT

CROSS REFERENCE TO RELATED APPLICATION

This application claims priority to U.S. Provisional Application No. 63/377,799, entitled System and Method for Improved Marketing Compensation By Means of Recognition of Natural Promotion in Media Content, filed on Sep. 30, 2022 the contents of which are incorporated herein by reference into the present application.

BACKGROUND OF THE INVENTION

Business models to compensate media content (MC) creators and distribution platforms have varied over the years, though the business models have mainly fallen into three groups—purchase, subscription, and advertising. There are other less common approaches and additionally there are cases that are a hybrid of these approaches often with limitations on rights to consume MC based on a limited time consumption period or a limited consumption method (or other elements). The purchase model is simplest—historically, the consumer buys a copy of content (e.g., the purchase of a blockbuster film on Blu-Ray DVD, or a digital download of the blockbuster film). Most often the rights that go along with the purchase are limited—e.g., it is just for personal, non-commercial, non-public consumption, not to be copied or shared further (e.g., pirated). The subscription model is often used for streaming digital rather than physically deployed premium content, in which a consumer pays an amount for the right and ability to consume the content (e.g., Video on Demand—pay $10 to watch the blockbuster for a limited time on a TV), or for watching a collection of content over a set amount of time (e.g., watching a popular series on TV over the course of a month—such as via a Netflix subscription). The Advertising model has two main methods—external advertising breaks and in-content promotion. In the case of external advertising breaks the content has pre-roll, in content, or post-roll advertising for a given period of time added to, or around the MC. It is often the case that the inserted advertising has little to nothing to do with the MC itself, but the advertising is generally based on generalized or specific viewer demographics, viewing history, etc. (e.g., if you have searched for dog related media content—there is an increased chance you will be served a dog food advertisement). The other method is in-content product promotion in which there is inclusion of product promotion within the MC itself—often presented by the MC creator themselves (e.g., in a video discussing breeds of dogs the MC creator pauses and says something along the lines of "I always choose to feed my dogs brand X dog food because it make them healthy, happy, and strong" and then goes on talking about dog breeds or alternatively there may be cans of brand X dog food appearing all around the dogs in the MC).

The inclusion of in-content product promotion may be explicit or implicit. Often there are explicit cases of in-content product promotion where there is a statement that this MC is brought to you by a given company or brand, or this content includes paid promotion, or some similar statement. Generally, these promotions are often like awkward advertising breaks and may have a limited amount to do with the subject matter of the MC itself (e.g., in the example of the video discussing the dog breeds—the MC creator may pause the dog discussion to say something along the lines of "When making my videos internet security is very important to me that is why I always use Nord VPN—you should try it and use the promotion word Dogs to save an extra 10%"). In these explicit cases there may be little natural connection between the promotion elements and the true thoughts or feelings of the MC creator, and the product being promoted (other than the fact that the MC creator is getting paid for such promotion). Current implicit in-content product promotion attempts to make the product promotion seem more related to the subject matter of the MC itself and that the MC creator feels more connected to what they are promoting (e.g., in the example of the video discussing the dog breeds—the MC creator may pause the dog discussion to say something along the lines of "I always choose to feed my dogs The Farmer's Dog food—they really love it and it is good for them too"). This approach is frequently used by social influencers who are often reviewing products in their MC. Unfortunately, in both the implicit and explicit cases often the product or brand promotion appears to the consumer inauthentic, insincere, unnatural, and forced—that the MC creator is including the promotion merely as an ad that they get paid for—rather than actually believing in what they are saying. While the intention is for the MC creators (who are often style and product influencers for large groups of people) to promote the products or brands in such a way that MC consumers are more likely to consume the product being promoted, however the inauthentic, insincere, disingenuous, or unnatural way that the product promotion is done—it often has no positive, or even may have a negative, brand promotional effect.

There is an ever-growing number of MC creators, MC, and platforms on which the MC may be distributed on. MC consumers engage in MC consumption sessions of highly variable durations from a few seconds to several hours. These factors result in an ever more fragmented consumer environment that makes it more difficult for brands or advertisers to reach their targeted consumers with scale and efficiency. Though while this more fragmented consumer environment results in smaller consumer groups, the individual fragments are highly focused and thus very valuable if the specific groups can be successfully reached in a meaningful way. Honest, "Word-of-mouth" style marketing from trusted MC creators (e.g., MC that has natural promotion elements—which is MC that includes one or more of the characteristics of being authentic, honest, sincere, organic, genuine, real, candid, unforced, natural, or other similar features) is one of the most effective methods of marketing and promotion. This is especially true if the MC is from someone that the MC consumer respects or has an emotional/psychological/intellectual connection with.

Furthermore, if the MC creator attempts to promote something to their MC consumers in a way that is in any way insincere, unnatural, or contrived it may result in the consumer having negative feelings about the MC creator, the distribution platform, or the product/brand they are promoting. It would feel similar to being tricked or lied to. MC creators need to be compensated for their work while companies want to promote their products, and consumers want to enjoy authentic MC. The described invention provides a robust solution that enables MC Creators and MC distribution platforms to be compensated, advertising companies to promote their products/brands, and consumers get meaningful MC in a natural, organic way that may be created, targeted, and distributed in an efficient scalable way.

SUMMARY OF THE INVENTION

Accordingly, there is a need for a method and system that supports scalable efficient marketing compensation for brand or product promotion within MC where the promotion is natural, not contrived, nor insincere, nor creating a negative impression of the MC creator, distribution platform, or brand/product that is promoted. Overall the system and method described herein provides a solution that is beneficial to the MC creator, the advertiser, the distribution platform, and the consumer by way of improving the potential compensation for the MC creator and the MC distribution platform, increasing the efficiency of the marketing of the brand, and providing the consumer more meaningful content while reducing required resources (including but not limited to, data storage space for MC, distribution server time, network delivery bandwidth, associated required energy, MC creator time, marketing spend, and perhaps most importantly consumer time). It should be noted that an organization (e.g., a company, corporation, partnership, or individual) may want to have marketing or promotion (e.g., advertising—and thus are an advertiser) for their brand or their product(s). Thus, in the described example embodiment the terms advertising, advertiser, brand, and product are used as is generally understood by those skilled in the art.

The MC includes, but is not limited to, a subset of or collectively: digital or digitized analog audio, digital or digitized analog video (just images, as well as, images and audio collectively), text, images, computer or artificial intelligence (AI) generated graphics/images/video/audio/text (including but not limited to computer/AI related physics engines, logic engines, impossibility limiters, game dynamics, actual content that has been manipulated, purely fake content, pure data, etc.), Virtual Reality (VR) content, Augmented Reality (AR) content, Mixed Reality (MR) content, graphical overlays, visible and invisible data, any metadata that describes or is associated with or related to the attributes of the MC (including but not limited to; thumbnails, tags, keywords, descriptions, creator associated with the content capture device, content capture location data, content capture time data, capture device identification data, capture device inclination data (or similar X, Y, Z axis angle data), capture device movement data, capture device altitude data (e.g., a drone), capture device orientation information, capture device camera data, capture device microphone data, contextual data, content element identification/description data, rights data, ownership data, ratings data, license data, content labeling data, title data, description data, use data, preference data, trend data, transactional data, and other similar data related to the content and how/when/where it was captured), collectively and any sub-set of which is hereinafter referred to as the content, media content, MC set, or MC. Furthermore, the MC may be live (truly live or near live—delayed by processing, and/or distribution, and/or distance to be transmitted) or pre-recorded and the live content may be truly live, or originally live and re-presented, or a combination of both. The MC may be complete, partial, edited, unedited, or otherwise manipulated in real time, after recording or a combination of any or all of these. Also, the MC can be spontaneously generated or previously generated and displayed in real time (or a combination of both) as may be the case of AI/computer-generated MC, or VR/AR/MR MC. Alternatively, the MC could have never been presented live and is just previously recorded or previously created.

The MC may be created or captured by an individual amateur (person or system), a group of amateurs, by a professional (person or system), a group of professionals, an automated capture device system(s), a computer/AI system(s), or any combination of these. Any or all of the descriptive data or metadata about or contained in the MC may be used to identify, organize, or sort the MC in the Media Content Library. In general MC is what is created by a MC Creator.

Furthermore, in this invention, MC includes but is not limited to, each individually, or in any combination; audio (in any digital format, e.g., aa, flac, mp3, way, wma, etc.), images (in any digital format, e.g., JPEG, TIFF, GIF, BMP, PNG, SVG, pdf, etc.), video (in any digital format, e.g., AV1, VP9, FLV, AVI, MOV, WMV, MPEG-4, MPEG-2, MPEG-5, HEVC, SD/HD/4K/8K/16K, etc.), LIDAR, text (in any digital format, e.g., txt, asc, etc.), video game content (in any digital format or language e.g., C++, Java, HTML5, CSS3, JavaScript, SQL, etc.), Computer Generated Imagery (CGI), AI generated MC, Virtual Reality/Augmented Reality/Mixed Reality (VR/AR/MR), visible, invisible, thermal images, medical records, seismic data, gravitational data, electromagnetic, IR, MM, NMR, X-ray, UV, radio, or any other similar digital data in any digital format, and descriptive metadata related to or that describes any of the types of digital content. Additionally, the system can also begin with analog content which can be converted to digital content and then the process can proceed as if it started with digital content. Furthermore, the system may transcode between different formats of MC or combine MC from different MC sets to allow them to be harmonized and combined in a coherent or coordinated way. Transcoding or combining may occur more than once in the system to successfully create MC.

The MC may be distributed toward distribution platforms or consumer consumption devices (directly to consumers, or via distribution platforms to consumers) based on a set of Distribution Rules. The term rule(s) is used generically (often in the simplest form being If-Then statements) these rule sets are often used in a coordinated way, taking into consideration goals and constraints, to arrive at desired final outcomes and may include one, some, or all set(s) of rules including, but not limited to, MC rules (e.g., inclusions, exclusions, title, content, subject matter, capture device, capture individual, date of creation, timing of creation, location of creation, angle of creation, capture device movement, language, ownership, rights, duration, rating, geographic location, maximum length, minimum length, maximum number of results, minimum number of results, bit rate, MC dimensions, aspect ratio, format, historical view count, "likes", reviews, date of consumption, rates of completion, etc.—including amongst other things any of the aspects of the MC, MC creator, or MC distribution platform), business rules, individualized or grouped preferences, individual or grouped viewership/sales trends, and variable randomization methodologies may be in whole, partially, or individually utilized to decide which MC or sub set of MC to utilize in any given embodiment of the MC. Furthermore, these rules may act as logical engines that may organize, prioritize, include, exclude, change the likelihood, etc. of a given individual MC item (subset of a MC item, or multiple MC items) to be used in the MC. The rules may be set by an individual, group, a system, a computer, or a combination of any of these. The rules may be pre-established or dynamically established, or a combination of both. The MC can be consumed via a user's content consumption device. Please note the terms "user", "viewer", "listener", "individual", and "consumer" are used interchangeably, generically, and could mean any creator/capturer of MC or consumer of any of the MC and the user could be a human individual, a group of humans, an animal or animals, another computer system, set of systems, or a combination of any of these. Additionally, the term "view" is used generically and can mean any method of consumption of the MC (e.g., read, watch, listen to, play (in relation to games), interface with, or otherwise experience). For MC sets to be considered different or unique they just have to have one element of the MC or related metadata that is different or unique. Furthermore, if a MC set is edited to be different from another MC set it may be considered to be unique.

The resulting MC may be distributed (e.g., transmitted toward a distribution platform or end user) by way of one or more of; wireless (e.g., 3G, 4G, 5G, etc.), wired, IP, Wi-Fi, Bluetooth, or any similar communication technologies on any connected device (e.g., a smartphone, tablet, personal computer, computer system, laptop, media streamer, smart TV, smart home speaker, game console, AR/VR/MR viewers, smart home appliance, a viewing device with a set-top box type processor, or the like, individually or in combination) that can also support MC playout. The MC may be distributed as a complete discrete set, may be streamed continuously, or may be a combination of segments that are distributed in batches. Additionally, the disclosed system and method allows for the MC to be played-out on a device that allows for one-way or two-way communication (in real time, near real time, synchronously, asynchronously, or stored and forwarded) such that distribution or use data related to the MC can be collected. The two-way communication allows for the MC consumption data to be collected and analyzed to support MC adaptations and changes, up to and including in real-time or near real-time. In some cases, the MC distribution or use data (including metadata) may also be delivered to a given MC consumption device and may be adapted for a given user or consumption scenario. Additionally, in some cases the MC playout device may act as a VR/AR/MR player in that when the playout device is moved in space or other contextual data is taken into system consideration the MC delivered or displayed adapts to the movement or context of the playout device and changes what is presented on the playout device. Furthermore, the MC rules may limit playout rights including but not limited to play/not play, only play certain sections, play specific MPAA (or similar) rated MC material (e.g., G, PG, PG-13, R, NC-17, X, XXX), play with or without advertisements, play only if content is paid for, only play in certain geographic regions, play only on specific MC distribution platforms, etc. The MC consumption data may be collected, analyzed, and interpreted by a user or the larger system and provide data as the basis for a feedback loop that enables the system to dynamically learn and adapt the next generation of MC creation or distribution. The MC distribution platforms may include, as examples but not limitations, amongst others, YouTube, Twitch, Facebook, Instagram, TikTok, Twitter, Pinterest, Vimeo, Netflix, Roku, Fire TV, Android TV, Google TV, Samsung TV, LG TV, VIZIO, Pluto TV, YouTube TV, Prime Video, Roku Channel, Xumo, Samsung+, X1, Apple TV, etc.

The disclosed system provides for, in some cases, continuously or periodically changing and updating the MC such that over time the MC at a given time is different than the MC that was initially created. These changes may be based on one or more of any relevant data such as additional individual MC sets, consumption rates, viewer reviews/feedback/"likes", viewers paying for or subscribing to MC, advertiser requests, consumer requests, distribution platform requests, sales performance (in commerce environments), clicks, impressions, requests for more information, clicked links out, QR codes accessed, resulting subsequent behavior, changes in user (or user device) location or contextual environment, changes in user or user and any other consumption related results (both from the individual viewer and/or from a plurality of users—including up to the full population of MC consumers), and also external data sources (changes in laws, regulations, licenses, business rules, or rights related to the MC, relevant related but external data, trends of other related content, historical or current media trends, product sales trends, news events, predicted trends, etc.). The feedback loop may use various sets of information and machine learning/artificial intelligence (ML/AI) analysis to improve the user experience by creating improved MC (including completely new MC). The disclosed system may use ML/AI systems using traditional or quantum computing methodologies to aid in combining the individual MC sets, changing the rules, and even creating new computer-generated MC to better merge or fill gaps in the existing original individual MC sets such that the MC is optimized in accordance with the rules engine (AI may create some or even all of the MC). Furthermore, these ML/AI based approaches may be used specifically for improved interactive game play or VR/AR/MR experiences. Additionally, this system can be applied to recorded, live (or near live) MC capture or creation situations (e.g., as an event is occurring) and be applied to open-ended and non-predetermined storytelling (in which there are not pre-defined plots or endings to MC sets, but rather they develop through use over time and can be applied to any type of MC, including MC that is created by the user (or sets of users). This improvement process may be utilized for future MC consumption or also even as the MC is initially being consumed and the "end" of the MC that has not yet been consumed, captured, or created and the remaining MC may be altered based on this dynamic learning methodology (and/or feedback loop) to improve the remaining MC to be consumed. Furthermore, this information may be directed to those individuals or systems that are capturing or creating MC such that they may adapt their capture or creation to the feedback information (a rapid and responsive feedback system).

In alternative embodiments, additional third-party Other MC may be used and included in the MC. Other MC may be any MC that is captured or created by any process other than the primary MC Creator. By way of example, but not limitation, Other MC could be MC that is captured or created by commercial or professional capture equipment, or the Other MC could be computer generated MC, ML/AI MC (computer generated "fake" MC or computer manipulated "real" content), URL's, links to other content (or MC), advertising MC, editorial MC, instructional MC, informational MC, commercial MC, or other alternative MC. Furthermore, in all cases the MC may intentionally or unintentionally contain any mix of amateur captured MC, professional captured MC, and Other MC (or any mix of any sub-set of data in any of the MC sets).

The disclosed system and method may be configured to utilize a set of MC Distribution Rules to manage and govern the distribution of the MC. Please note there is not necessarily only one version of the MC, there may be multiple sets of MC at any given time and the make-up of those sets may change over time as governed by the MC Business Goals and Rules set and the rules may be applied at the population, sub-set, or individual level of either (or both) of the MC and viewer. It may be the case that different users get different sets of MC, and even if the MC sets start the same the MC sets may change over time. The MC sets can grow and branch over time, developing linear and non-linear "story lines". Additionally, the MC Business Goals and Rules set may take into consideration items such as, but not limited to, the elements within the MC, promotion requests, distribution rules, platform rules, intellectual property rights of the MC, the MC distribution playout platform, subscription rights to the MC, the network the MC is distributed over (e.g., unlimited home Wi-Fi or pay per bit delivered mobile networks, high bandwidth networks or low bandwidth networks, etc.), or the technical ability of the playout device (e.g., a speaker alone, versus a HD/4K/8K video display, versus a VR headset, versus a smart phone). Furthermore, it should be recognized that the resulting MC may be a collection of a wide variety of different content, including but not limited to, entertainment, education, information, commerce, gamming, security analysis, police investigations, military strategy, emergency response, crowd analysis, medical data, health data, machine data, industrial data, and the like.

By way of example but not limitation, the MC library may be one or more databases that may store actual MC, or alternatively it may store information data that describes content (e.g., metadata), or it may store both MC and descriptive metadata material. The one (or more) databases and the one (or more) processors that manage the MC library may be physically located together or apart (e.g., in the cloud). In general, the one or more processors have resident software (and additional software may be added over time—with additional instructions) to enable or configure the one or more processors to perform or execute the disclosed activities including but not limited to acting as rules engines. The digital environment (especially the make-up of the MC, the elements related to promotion, the goals, the rules, the distribution, the consumption, the evaluation of the results of the MC, the resulting compensation, and the iterative feedback process) may utilize traditional classical computing, quantum computing, momentum computing, or a combination of these. These computing processes may also use artificial intelligence/machine learning (AI/ML) systematic approaches partially or completely to increase the efficiency and performance of the system, improving quality while reducing processing time, distribution of less-than-optimal MC, and use of other system resources.

As way of an example, but not limitation, a general embodiment of the system and method may be described in summary as follows: A MC Creator produces a piece of MC (in this example a video discussing a comparison of fast-food chicken sandwiches to identify the chicken sandwich the MC Creator feels is best). This MC may then be posted to (distributed to) MC platforms such as YouTube or Instagram. As part of the MC post, it is identified with tags (or other ways including, but not limited to, thumbnail image, title, keywords, links, or other associated metadata) by the MC Creator as a video that may be considered for monetization. This monetization choice kicks off a series of processes that in this example case begins with the MC going through an analysis process that reviews the MC and takes into consideration amongst other things visible elements, audio elements, contextual elements, presentation style elements (e.g., natural, authentic, honest, etc.), intonation elements (e.g., sincere or sarcastic, positive or negative), and metadata elements. In alternative embodiments the MC Creator does not need to affirmatively request that the MC be considered for monetization, the review process may occur automatically and additionally the system may alert to MC Creator of the monetization opportunity (and possibly the scale of monetization).

In this example case the metadata and MC elements indicate, amongst other things, (as examples rather than limitations) that the MC was created by JoeyBurger23 in the U.S., it is 4K video with clear image resolution, has 16-bit balanced stereo audio, has a title of "The Best Chicken Sandwich", and has a duration of 20 minutes (amongst other characteristics). The image analysis recognizes elements including McDonalds, Burger King, Wendy's, Popeye's, Chick-fil-a, Coke, Pepsi, Honda, Casio, and Hollister due to logos and identifiable unique product attributes. The audio analysis also identifies elements including McDonalds, Burger King, Wendy's, Popeye's, Chick-fil-a, Checkers, KFC. The metadata tags also include the brands McDonalds, Burger King, Wendy's, Popeye's, and Chick-fil-a. The audio and video analysis also identifies amongst other things, positive sentiment, negative sentiment, honesty, sincerity, authenticity, naturalness, sarcasm, parody, irony, distain, love, hate, and other feelings through direct visual, audio, metadata, textual analysis, contextual analysis, tone and expression analysis along with items such as duration, relative volume, and clarity (collectively the ease of recognition). Additionally, the audio, video and metadata timing and X-Y location in the MC of each brand element is identified and the duration of each is identified along with items such as, relative portion of the screen, and clarity (collectively the ease of recognition).

In this example case "The Best Chicken Sandwich" MC has one minute primarily about McDonalds, two minutes primarily about Burger King, one minute primarily about Wendy's, two minutes primarily about Chick-fil-a, three minutes primarily about Popeyes, and furthermore Coke and Pepsi are both identified for two minutes (they are the identifiable drink brands ordered along with the chicken sandwiches), the Honda car brand is identified for portions of one minute (it is recognized as the car used to drive to the different fast-food restaurants), the Casio watch brand is identified for portions of three minutes (it is recognized as the watch brand that the reviewer is wearing), Hollister is identified for portions six minutes (it is the shirt brand that the reviewer is wearing, Zaxby's and Red Robbin are both identified for 30 seconds (they are mentioned as chicken sandwiches that were not tried). In addition to recognition of the brands themselves, the authenticity and naturalness of the presentation along with the character of the sentiment and sincerity of the MC presentation may also be identified. In this example case the reviewer describes the McDonald's and Wendy's chicken sandwich as merely OK ("a fine choice if you are hungry for chicken and there is not a better sandwich available"), while the Burger King sandwich is strongly criticized ("only eat this sandwich if you hate your tastebuds and stomach"), the overall the Chick-fil-a sandwich and brand are praised ("always a very good choice, consistent, and cooked just right. Also, Chick-fil-a is always a friendly, quick, and clean place—very good sandwich very good restaurant"), the Popeye's sandwich is declared the best and highly praised ("the biggest piece of chicken, the right amount of crispy breading surrounding the juicy chicken with large crunchy pickle slices and peppery spicy sauce brining it all together—a great chicken sandwich—clearly the BEST CHOICE!"), also not discussed in the audio are Coke, Pepsi, Honda, Casio, and Hollister.

In furtherance of the example case, separately Coke, Chick-Fil-a, Popeye's, Hollister, Honda, and Burger King have each contracted with YouTube to purchase advertising elements related to their brands and products. They have each chosen from particular MC parameter requirements dealing with aspects of characteristics such as naturalness, authenticity, organic, passive or active brand presentation, positive, negative, or neutral brand presentation, degree of sincerity, amount of sarcasm, contempt, or criticism, minimum amount of time the brand is shown or discussed, audio and or video presentation of the brand, percentage of the screen the brand is shown on, the amount of time the brand is continuously shown, if the brand is compared positively or negatively to competing brands and other similar elements (depending on the make-up of the content itself—audio, video, text, etc.). In this given example Coke is engaging in a general brand promotion and the passive inclusion of Coke in the video meets their requirements. Chick-fil-a is engaging in a promotion to promote its brand overall and the video meets their requirements. Popeye's is engaging in a promotion to differentiate themselves from competing fast-food restaurants and this video meets their requirements. Hollister is engaging in a promotion of their brand, but this presentation of the brand is too passive to qualify and does not meet their requirements. Honda is engaging in a brand promotion, but the duration of the Honda brand presentation is too short and too passive to qualify and does not meet their requirements. Burger King is engaging in a general branding promotion, but the sentiment is too negative to qualify and does not meet their requirements.

In the example case the fee charged to the advertiser and the amount shared with the MC creator, the distribution platform, and in a possible embodiment, the MC Natural Promotion System operator may be calculated as an example, but not limitation, as a product of rates for each element including but not limited to the authentically natural positive sentiment of the brand discussion, the percent of screen the brand related images take up, the amount of audio related to the brand, related sales, click throughs, leads generated, etc. Multiplied by the amount of time these aspects are presented to the consumer multiplied by the numbers of views the video gets (through to the given point in the video). Alternatively, compensation may be based on a flat fee, a commission, pay per view, pay per minute viewed, pay per new customer, or any combination of these. Furthermore, it is often the case that currently brands get natural promotions in videos and they do not have to pay for them and while under the example process the advertiser will have to pay, but they will now be paying for natural, sincerely authentically more powerful presentations, more targeted MC distribution, and will not have to pay for traditional ads for the same impressions—but under the proposed model the impressions will be much more valuable for brand promotion. Additionally, in the example case the advertiser could be informed as to who the MC creator is—potentially opening up the possibility of direct relationships between the advertiser and the MC creator (who already has a natural brand affinity for the advertiser's brand). Also, the increased information related to the distribution platforms can inform later marketing and advertising campaigns. The MC creator information, the distribution platform information, the user consumption information can be efficiently coordinated in a feedback loop to create next generation MC to improve the achievement of advertisers marketing goals.

As described herein, the disclosed system provides a process for calculating compensation for the MC creator, the distribution platform, and the operator of the MC Natural Promotion System that may be associated with achieving brand promotion goals by way of the recognition and distribution of MC that has natural promotional element(s) that match with the advertiser's brand promotion goals being distributed (transmitted) to users. This system achieves this efficiently and effectively while minimizing resource consumption. The natural promotion media content analysis, distribution, and compensation system provides for receiving and storing MC from one or more sources, evaluating the MC set, transmitting (distributing) the resulting at least one MC set toward at least one distribution platform and by extension toward MC user's MC consumption device, analyzing the distribution or the consumption of the MC, and calculating compensation to be paid to MC creator(s), distribution platform(s), and MC Natural Promotion System operator. This system includes, amongst other things; at least one electronic database configured to receive and store at least more than one set of MC; at least one electronic database configured to receive and store a set of business rules and goals related to media content; at least one database configured to receive and store at least one set of natural promotion marketing requests (advertiser requested natural promotion elements) from at least one advertiser; at least one processor communicatively coupled to the at least three electronic databases (which may be combined into one or more databases and may act in a coordinated way), at least one processor with software instructions stored therein that, when executed by the at least one processor, configure the at least one processor to execute the software instructions, at least one processor configured to: scan the at least more than one MC sets, recognize natural promotional elements in the MC, compare the MC set sets to the media content rules media content goals, and advertiser's media content goals to find MC that complies with all of the given rules and goals that may be distributed. The system also includes among other things at least one database to receive and store at least one set of distribution rules that is communicatively coupled with the processor to distribute the media content toward distribution platforms or user's media content devices. At least one processor is configured to analyze the distribution of the media content, calculate the compensation due to the MC creator, the MC distribution platform, and the MC Natural Promotion System. The at least one processor is also configured to evaluate the results of the MC distribution, inform the advertiser of the results of the program, and inform the MC creator and MC distribution platform of the results of the MC distribution. This results information may provide a feedback loop to create new MC that will continue improve the efficiency and quality of the results. This described system is a collection of commutatively coupled parts performing in a coordinated way resulting in a coherent and harmonized combined content set and user experience through the process of recognizing, identifying, and distributing media content that contains natural promotional elements in order to achieve a set of goals related to successful brand promotion while minimizing resource consumption. Also, the system also supports MC that is amongst other things video with audio, video alone, or audio alone.

The method disclosed herein for recognizing or identifying natural promotional elements in media content, the distribution of media content containing natural promotional elements, the analysis of the performance of the media content containing natural promotional elements, and the compensation of media content creators and distribution platforms in accordance with goals, rules, and advertisers' requested promotion. Additionally, the disclosed method provides for calculating compensation to at least one media content creator and at least one media content distribution platform based on at least one natural promotional element in the at least one media content that matches with at least one advertiser's promotion goals and the distribution of the at least one media content. The described process provides a method for compensating media content creators and media content distribution platforms based on the natural promotional elements in the media content and the distribution of the media content, the method comprising: storing in at least one electronic database configured to store at least one set of information related to an advertiser's promotional desires that may be configured to inform the establishment of a set of rules and goals related to the media content; generating by at least one processor with software instructions stored therein that, when executed by the at least one processor, configure the at least one processor to execute: generating by at least one media content rules and goals engine configured to generate at least one approved natural promotion element characteristic based at least on one media content rule; applying at least one compensation characteristic for at least one natural promotion element in media content; utilizing at least one processor configured to analyze media content in relation to natural promotional elements, wherein the results of the media content analysis and the compensation characteristics are utilized to recognize or identify the at least one media content set; wherein at least one distribution engine is configured to distribute media content toward users; wherein at least one processor is configured to analyze the distribution of media content with natural promotional elements and the advertiser's at least one compensation plan to calculate the compensation for the media content creator and the media content distribution platform; and at least one processor configured to compare the at least one result with the at least one media content rule and goal. Also, the media content business rules and goals engine is further configured to provide instructions for new content creation based on at least one other historical result of natural promotion elements in media content.

BRIEF DESCRIPTION OF THE DRAWINGS

FIG. 1 illustrates a block diagram of a system for creating and evaluating MC in accordance with an exemplary embodiment.

FIG. 2 illustrates a flowchart for a method of creating and evaluating MC in accordance with an exemplary embodiment.

DETAILED DESCRIPTION

Figure 3:
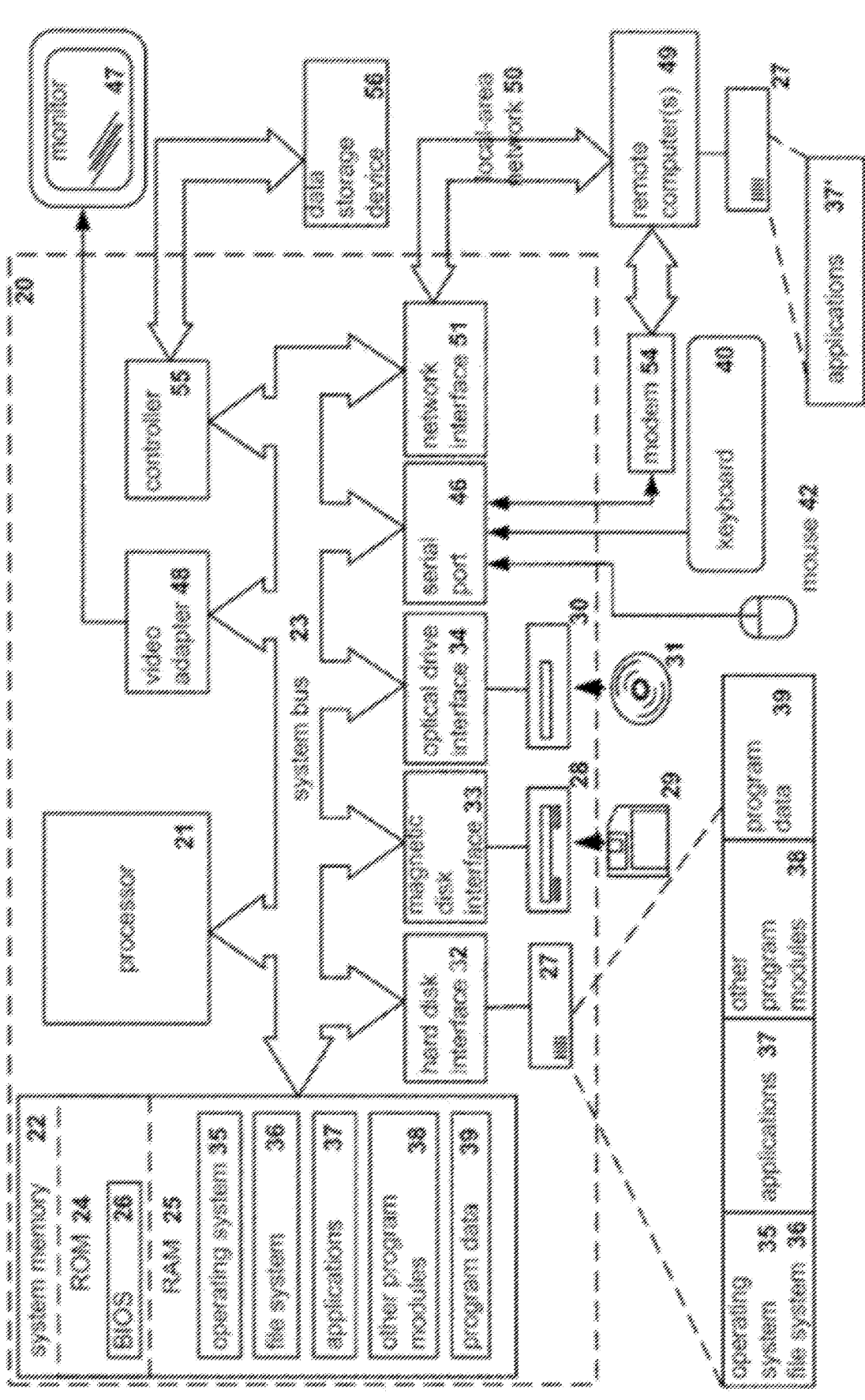
FIG. 3 illustrates an example of a general-purpose computer system in accordance with an exemplary embodiment.

The following detailed description outlines possible embodiments of the proposed system and method disclosed herein for exemplary purposes. The system and method disclosed are in no way meant to be limited to any specific combination of hardware and software. As will be described below, the system and method disclosed herein relate to the creation, analysis, distribution, and compensation for MC to achieve a set of goals in accordance with a set of rules. It should be appreciated that each of the components in the figures below are illustrated as simple block diagrams and flowcharts, but include the requisite commercial, mechanical, physical, digital, hardware, and software components needed to perform the specified functions as would be appreciated by one skilled in the art. For example, one or more of the components described below can include one or more databases, one or more computer processor units (CPUs) configured to execute software programs stored on electronic memory in order to execute the algorithms disclosed herein, these databases and CPUs may be located together or apart, physically, or virtually, and may be classical (traditional), quantum, momentum, AI, or a combination of these types of computer processors. In general, the term computer can refer to classical (traditional) computing, quantum computing, momentum computing, artificial intelligence, machine learning, and any combination or subset of these, and these approaches may be applied sequentially or in parallel (or a combination of these) and amongst other things may function as rules engines in performing the various tasks herein. It should be noted that from the following discussion, alternative embodiments of the systems and methods disclosed herein will be readily recognized as viable alternatives that may be employed without departing from the principles of what is claimed.

Reference will now be made in detail to multiple embodiments, examples of which are illustrated in the accompanying figures. It is noted that wherever practicable similar or like reference numbers may be used in the figures and may indicate similar or like functionality. The figures depict embodiments of the disclosed system and method for purposes of illustration only. One skilled in the art will readily recognize from the description that alternative embodiments of the systems and methods illustrated herein may be employed without departing from the principles described herein.

For example, but not limitation, FIG. 1 is a basic exemplary example of the MC Natural Promotion System. It should be noted that each of the following elements may be performed systematically and automatically with or without user intervention, or each may also be performed with a user override. Additionally, the rules or goals of this MC Natural Promotion System (100) may be pre-set or may be dynamically adapted in real-time/near real-time (continuously or periodically), and the adaptations may be based on the information that is available at that time, and also as additional information becomes available the rules or goals may be further dynamically (continuously or periodically) adapted. Furthermore, the goals or rules of this system (100) may be updated or adapted periodically or continuously based on pull or push commands internal or external to the system. These changes may be based on either or a combination of user/AI/ML input and will be described in more detail below. Furthermore, the entire process may occur with multiple sets of MC and the process sequence may be nested with different sets of MC being processed at separate times, synchronously, or asynchronously. Also, the various elements of the process may occur in the original sequence, in alternative sequences, in parallel, or may even skip elements of the process in various embodiments, especially when the process (or portions of the process) is run multiple times.

The Media Content Business Rules and Goals Engine (101) may cover a wide variety of things including or excluding, by way of example, but not limitation; goals of maximizations or minimizations of elements including: platforms the MC is consumed on, the number of times the MC is consumed, the total duration of time MC is consumed, the average duration MC is consumed, the total revenue driven by the MC, the total number of clicks driven by the MC, the revenue per minute of the MC consumed, the revenue per view of the MC, the clicks minute of the MC consumed, the clicks per view of MC, the total number new viewers driven by the MC, the number of new viewers per minute of MC consumed, the number of new viewers per view of MC, the editorial quality (e.g., critically acclaimed nature) of the MC, the profitability to the creator or the platform of the MC, the number intellectual property restrictions or requirements, nature of licenses, date of creation, geographic source, maximum content set length, minimum content set length, maximum number of content items (e.g., a series), minimum number of content items, quality of media content, business rules, legal requirements, ethical considerations, individualized or grouped preferences, play/not play, only play certain sections, play specific MPAA (or similar) rated MC material (e.g., G, PG, PG-13, R, NC-17, X, XXX), play with or without advertisements, play only if content is paid for, only play in certain geographic regions, etc. and the like, either individually or as a set and these can each be prioritized. While the MC rule sets may be based on elements, including but not limited to; source of the MC, impact of the MC, ethics, legal considerations, business considerations, impacts on future generations, impact on the broader ecosystem, MC inclusions, exclusions, placements, prioritization, weighting based on; content of the MC, MC type, MC capturer/creator, MC source, title, subject matter, MPAA or other agency rating, intellectual property restrictions or requirements, rights, licenses, time of creation, language, duration, rating, geographic location, maximum length, minimum length, maximum number of results, minimum number of results, bit rate, MC dimensions, format, historical view count, "likes", reviews, date of creation, rates of completion, business rules, individualized or grouped preferences, individual or grouped viewership/sales trends, MC of a certain age, that includes certain elements, has resulted in a certain level of sales, has provided a certain quantity of viewership, is related to certain brands/personalities, or there is a desire to promote, and the like. While discussed more below, there may be different MC distribution rule sets based on attributes, including but not limited to; the viewer, subscription status, intellectual property rights, viewer profile, viewer age, viewing device, viewing time, viewing location, if the viewer is a person or machine, viewing history and the like. Furthermore, in this embodiment the authenticity, sincerity, honesty, naturalness, genuineness, sarcasm, distain, passion, love, hate, respect, or other related emotion and intent of the presentation's visual, auditory, or metadata elements of the MC (in a positive or negative way) may be taken into consideration. In addition, the strength, clarity, and duration of these characteristics are included in the consideration set. The different variable characteristics that drive the selection of the MC may be weighted in any proportion as deemed appropriate such that MC component items may be specifically included, excluded, prioritized, and/or given a probability of being included in a final MC. Please note the term "sets" is used generically herein and may mean any collection of a given thing (including the null set (an empty set), a singular set (a set with a single component), or multiple set (a set with multiple components, including subsets)). Also, there may be overlap or duplication between goals and rules.

The Media Content Business Rules and Goals Engine (101) may be applied to both New Content (103) that is being created and also Existing Content (102) to identify content that is compliant with the rules and may have potential to achieve the goals in light of the rules. The content that is found to be compliant with the rules and may have the potential to achieve the goals becomes part of the Media Content Library (104). The Media Content Business Rules and Goals Engine (101) may also influence and inform the creation of New Content (103). As an example, JoeyBurger23's MC "The Best Chicken Sandwich" is existing content and is compliant with the Media Content Business Rules and Goals Engine (101) and thus is included in the Media Content Library (104).

A company or advertiser that wants to have their brand or product promoted by way of MC creators or MC distributors and the MC with natural promotion elements utilizes the Promotion Request Engine (105). The Promotion Request Engine (105) may be a database with a connected coordinated processor and may include one or more of the following; the advertiser's requests in relation to the brand(s) or product(s) that they want to promote, the type of the promotion they want, the characteristics of the natural promotion elements they want, the time frame of the promotion, the rate paid for the promotion, the platform(s) the promotion runs on, or any of the elements that may be measured in the MC, through the distribution of the MC, or through the compensation of the MC. As an example, and as previously discussed, a few brands have existing promotion requests in the Promotion Request Engine (105) including Coke, Chick-Fil-a, Popeye's, Hollister, Honda, and Burger King. Each company contracted with YouTube to purchase advertising that contains natural promotional elements related to their brands and products. They have each chosen from particular MC parameter requirements dealing with aspects such as characteristics of naturalness, authenticity, and overall positive brand positioning without sarcasm or contempt for their brand. As previously referenced companies may choose to utilize the described system and method for a variety of reasons including, amongst others, that the MC Natural Promotion System (100) enables the company to have a direct relationship with effective and passionate brand ambassadors that are able to present their brands and products in ways that resonate with the target consumers through their organic and natural presentations in MC. This type of promotion is generally much more effective than traditional advertising because of its authentic messaging and improved quality.

MC from the Media Content Library (104) may enter the Media Content Analysis Processor (106) which reviews the MC in light of the Promotion Request Engine (105). The Media Content Analysis Processor (106) has the ability to recognize, identify, and analyze the MC elements within the MC and the metadata that describe the MC, understanding what elements make up the MC, the duration of the natural promotion elements, the proportion of the natural promotion elements in the MC, the sentiment of how the natural promotion elements are presented in the MC, the relationship between the various promotion and non-promotion elements in the MC. The Media Content Analysis Processor (106) analyzes the MC in order not to just recognize or identify what image/audio/metadata elements are part of the MC, how long they are in the MC, their location in the MC (amongst other things), the naturalness/authenticity/honesty of the MC, it also analyzes the feeling, emotion, or sentiment of the parts of the MC. This sentiment analysis takes into consideration a variety of somewhat abstract emotional aspects of the MC through the review of items including but not limited to physical movements, expressions/micro-expressions (including but not limited to pupil dilation, nostril flaring, skin flushing, micro-tremors, eyebrow movement, forehead wrinkling, jaw tightness, mouth dryness, lip licking, eye contact, blinking patterns, shaking of throat, hand shaking, sweating, throat clearing, side glances, smiling, frowning, mouth open, yawning, laughing, wide eyes, facial creases or wrinkles, tearing, runny nose, sniffles, asymmetric facial movements, breathing rate changes, etc. e.g., "tells"), vocal or auditory expressions (including but not limited to vocal tone, pitch, pace, pauses (and placement of pauses), phrasing, vocal tremors/micro-tremors, speech patterns, word choices, vocal volume changes, tongue clicks, dry mouth sounds, wet mouth sounds, emphasis, enunciation, articulation, intensity, fluency, consistency, timbre, resonance, inflection, endurance, pronunciation, etc.), physical movements, video focus choice, video effects, sound effects, choice of words, choice of expressions, choices of terms, choices of items included in MC, the context of each element in the MC, the MC in the larger context of things going on in the environment outside of it, the historical/cultural context of the MC (e.g., a positive expression in one culture may be a negative expression in another culture), and elements in the associated metadata.

The sentiment analysis can recognize and identify a wide variety of feelings or emotions including but not limited to, love, hate, neutral, expressionless, honest, natural, organic, authentic, sincere, insincere, sarcastic, comedic, angry, happy, sad, scared, hopeful, earnest, disinterested, disgusted, offended, surprised, shocked, fearful, excited, passionate, intriguing, nervousness, shameful, boring, compassionate, admirable, embarrassing, etc. The Media Content Analysis Processor (106) enables the matching of natural and authentic MC with a sentiment or sentiments a given advertiser wants in their natural promotion brand campaign. This ensures that the MC matches promotional goals of the campaign in a given context (taking into consideration amongst other things culture, timing, audience, consumption device, etc.)—e.g., matching the advertiser's requested natural promotion element (or characteristic) with natural promotion element(s) in the MC. In the given example, the Media Content Analysis Processor (106) provides the analysis that the MC "The Best Chicken Sandwich" presentation content and sentiment align with the goals of the brands. For example, Coke is engaging in a general brand promotion and the passive presentation of Coke in the MC meets their requirements. Chick-fil-a is engaging in a promotion to promote its brand overall and the authentic positive nature of the brand positioning and enthusiastic brand discussion in the MC meets their requirements. Popeye's is engaging in a promotion to differentiate themselves from competing fast-food restaurants and the natural passion about this chicken sandwich being the best in the MC meets their requirements. Hollister is engaging in a promotion of their brand, but this MC presentation of the brand is too passive to qualify and does not meet their requirements. Honda is engaging in a brand promotion, but the duration of the Honda brand presentation in the MC is too short and too passive to qualify and does not meet their requirements. Burger King is engaging in a general branding promotion, but the passionate sentiment in the MC is too negative to qualify and does not meet their requirements.

The Media Content Distribution Rules Engine (107) is informed by the Content Analysis Processor (106) and the Promotion Request Engine (105). As part of the process, what, where, who, when, and how the MC is to be distributed (transmitted) is decided upon (MC distribution targeting). These rules may align with maters also included in the Media Content Business Rules and Goals Engine (101) and may cover a variety of things related to the distribution of MC, including but not limited to, the platform(s) the MC is distributed on, compensation requirements for the MC (e.g., pay per view, subscription, etc.) the geography (or IP Address ranges) that MC is distributed to, age restrictions, rights restrictions, frequency of distribution, etc. The Media Content Distribution Rules Engine (107) may also take into consideration the natural authenticity, the related sentiment, and cultural norms of the MC as to where the MC is distributed towards. Overall, the Media Content Distribution Rules Engine (107) may identify a distribution platform or end user set that MC (which matches with the advertiser's goals) may be distributed towards. In the given example, Chick-fil-a and Popeye's may choose to not promote the example MC into geographies that are not served by their restaurants. Or alternatively they may choose to promote the example MC more heavily in geographies that they are strongly competing in and are looking to gain market share. Additionally, the Media Content Distribution Rules Engine (107) may take into consideration the platforms that may be used to distribute the MC upon (and any related business relationship). The Media Content Distribution Server (108) is configured to push the MC toward the MC consumer or towards a distribution platform without a request or transmit the MC toward the MC consumer or towards s distribution platform when there is a request (e.g., pulled). The Media Content Distribution Server (108) may transmit directly toward the end MC consumer or there may be one or more services (servers, sites, platforms, etc.) before the MC reaches the consumer.

The Media Content Distribution Analysis Processor (109) is constructed to analyze the distribution of MC, keeping track of items including but not limited to what MC was distributed, what platforms it was distributed on, what end user it was distributed to, when it was distributed, how many times it was distributed, the amount of time it was distributed, the viewing bit rate, the viewing resolution, the portion of the content that was distributed, where was it distributed, who it was distributed to, in what way was it distributed (including items such as complete views, partial views, skips, view time, pauses, fast forwards, replays, etc.), what was the path to the MC (search, guide appearance, browsing, what was the prior content viewed, etc.), where the viewer wend after viewing the MC (other content from same MC Creator, exit platform, click through to related link, another search, etc.), and also analyzing the nature of the consumer (target consumer, non-target consumer, bots, etc.) as well as, the clicks, likes, related clicks, related content requested, QR code activations, sales, requests for information, calls, or other MC related activity. The Media Content Distribution Analysis Processor (109) may analyze the distribution of MC toward distribution platforms, MC consumers, the consumption of the MC by the distribution platform, or the consumption of the MC by end users. In relation to the example case the Media Content Distribution Analysis Processor (109) evaluates the consumption of "The Best Chicken Sandwich" MC.

The Compensation Analysis Processor (110) takes into consideration the information from the Promotion Request Engine (105) dealing with, including but not limited to, what natural promotion advertisers want to buy, the characteristics of what they want to buy including, the natural promotion elements in the MC, the quality of the natural promotion elements in the MC, how the natural promotion elements are presented, where the MC is presented, the duration of the promotion element presentation, the clarity of the promotion element, how much is to be paid for each natural promotion element presentation of a given duration, etc. These compensation elements are reviewed with information from the Media Content Distribution Analysis Processor (109) which reports on the actual distribution of the MC. Collectively these sets of information are utilized to arrive at the compensation that is due to the MC creator, the distribution platform, or the MC Natural Promotion System. In the given example where JoeyBurger23 chose to monetize "The Best Chicken Sandwich" MC and brands such as Coke, Popeye's, Chick-fil-a, Burger King, Hollister, and Honda want to compensate MC creators and distribution platforms for meaningful natural promotion MC that aligns with their brand natural promotion goals. Based on the given compensation model, the MC, and the MC distribution by the Media Content Distribution Analysis Processor (109) The Compensation Analysis Processor (110) calculates the payment due to the MC creator, if applicable the distribution platform, and in some embodiments the administrator of the MC Natural Promotion System (100). In this example case, only Coke, Chick-fil-a, and Popeye's advertising request matches for compensation.

The Results Evaluation Processor (111) provides analysis of the MC distribution and consumption in light of the rules, goals, and the promotion request. This may also take into consideration other MC consumption items such as (but not limited to) click throughs to linked brand related sites, likes, shares, sales, etc. The Results Evaluation Processor (111) provides a feedback loop to provide Results for Advertiser (112) which in turn helps to inform the Promotion Request Engine (105) and also the Media Content Rules and Goals Engine (101) to provide continued improvements of the process, the MC, the MC components, the MC creators, content to be added or removed from the MC, and the overall advertising campaigns. Similarly, the Results Evaluation Processor (111) also provides a feedback loop to the Results for Media Content Creator and Platform (113) which in turn helps to inform the creation of the New Content (103) and the Media Content Business Rules and Goals Engine (101). It should be noted that this entire process (or portions of the process) may occur in sequence or in parallel such that the MC, the MC distribution, the advertising goals, the target consumers, the MC distribution platforms, the business models, and any related parts of the process may adapt in real-time or near-real time to any given set of users. One of the advantages of the described system and method is the iterative nature of the process, continuously evolving and improving. Furthermore, this process enables improved consumer action attribution to specific marketing due to the targeted distribution of the MC.

For example, but not limitation, FIG. 2 is a basic exemplary example of the MC natural promotion method. It should be noted that each of the following elements of the process may be performed systematically and automatically with or without user intervention, or each may also be performed with a user override. Additionally, the rules or goals of this MC natural promotion method (200) may be pre-set or may be dynamically adapted in real-time/near real-time (continuously or periodically), and the adaptations may be based on the information that is available at that time, and also as additional information becomes available the rules or goals may be further dynamically (continuously or periodically) adapted. Furthermore, the goals or rules of this method (200) may be updated or adapted periodically or continuously based on pull or push commands internal or external to the system. These changes may be based on a given or a combination of user, advertiser, distribution platform. Consumer, or AI/ML input and will be described in more detail below. Furthermore, the entire process may occur with multiple sets of MC and the elements of the process may be nested with different sets of MC being processed at separate times, synchronously or asynchronously. Also, the various elements of the process may occur in the original sequence, in alternative sequences, in parallel, or may even skip elements of the process in various embodiments, especially when the process (or portions of the process) is run multiple times.

FIG. 2 illustrates a flowchart (200) of a method for calculating compensation a MC creator, a MC distribution platform, and provider of the MC Natural Promotion System based on the recognition, identification, and distribution of natural promotional elements in the MC that match with the advertiser's natural promotion goals. The method comprises, according to an exemplary embodiment (as an example, but not limitation), a company or brand (advertiser) wants to promote (advertise) themselves or their products via natural promotion on Media Content (205). A set of rules and goals related to the Media Content are established and may be stored in a database related to an advertiser's requested natural promotional elements in the MC (210) which may include but are not limited to; the amount of time in the MC that brand related natural promotional elements are presented, in the case of video MC the percentage of the video screen that is dedicated to promoting the brand, the authenticity of the natural presentation, the sincerity of the presentation, the conviction of the natural promotion, the geographic region the MC is available to, the inclusion or exclusion of competing products, the absence of potentially offensive or controversial other content in the MC, etc.

MC that has natural promotional elements or characteristics that are found to match with the rules and goals (215) are eligible to be distributed. A brand decides that they wish to do a promotion and provide some compensation for that MC that contains natural promotion elements (220) at this point the MC is analyzed to recognize, identify, and quantify the natural promotion elements (225) that the Brand is looking to promote. The MC that contains natural promotion elements is then distributed toward one or more platforms or consumers (230) in accordance with distribution rules. The quality and quantity of the MC distribution or consumption is analyzed in accordance with the compensation to calculate the amount of compensation that is due to the MC creator, the distribution platform, or the MC Natural Promotion System (235). These results may then be shared with the MC creator, the MC platform, or the brand to further improve MC and MC promotions going forward.

In relation to the example embodiment of the disclosed method may be described as follows: Popeye's is wanting to promote its brand by way of natural marketing. Popeye's is looking for video advertising with an authentic brand supporter that truly likes their chicken sandwich, and they have requirements associated with the MC (e.g., Popeye's positivity compared to other brands) and where the MC is to be distributed (e.g., only in locations within five miles of a Popeye's restaurant). The described process analyzes the MC titled "The Best Chicken Sandwich" and due to the strong natural positive sentiment exhibited in the MC (especially in relation to other brands) the process matches it with Popeye's natural promotion goals and identifies that MC as appropriate for distribution and monetization. Given the advertising compensation model agreed to by the brand, the MC creator, and the distribution platform(s), the marketing program goes forward. The marketing performance is analyzed, compensation is shared, Popeye's is able to work directly with the MC Creator and the MC is adapted and improved based on the results analysis.

FIG. 3 illustrates an example of a general-purpose (classical or traditional) computer system (which may be a personal computer, a server, or a plurality of personal computers and servers) on which the disclosed system and method can be implemented according to an example aspect. It should be appreciated that the detailed general-purpose computer system can correspond to the MC Natural Promotion System (100) described above with respect to FIG. 1 to implement the algorithms described above. This general-purpose computer system (processor and storage) may exist in a single physical location, with a broadly distributed structure, virtually as a subset of larger computing systems (e.g., in the computing "cloud"), or a combination of any of these. Please note this is provided as an example not a limitation and the example embodiment may also use a quantum computing system (including momentum computing) in place of the general-purpose computer, or a quantum computer could be used in conjunction with the general-purpose computer. This combination may be performed in parallel, or series, or both, and similarly there may be multiple general-purpose computers or quantum computers used.

As shown, the computer system 20 includes a central processing unit 21, a system memory 22 and a system bus 23 connecting the various system components, including the memory associated with the central processing unit 21. The central processing unit 21 can be provided to execute software code (or modules) for the one or more set of rules discussed above which can be stored and updated on the system memory 22. Additionally, the central processing unit 21 may be capable of executing traditional computing logic, quantum computing, or a combination of both. Furthermore, the system bus 23 is realized like any bus structure known from the prior art, including in turn a bus memory or bus memory controller, a peripheral bus, and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

As noted above, the rules described above can be implemented as modules according to an exemplary aspect. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general-purpose computer. Accordingly, each module can be realized in a variety of suitable configurations and should not be limited to any example implementation exemplified herein.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20. Moreover, it is noted that any of the storage mechanisms (including data storage device 56, which may be amongst other things, physical hardware, CDN(s), or the "cloud") can serve as the storage of the media Content, including the Available Content Library (111) described above, according to an exemplary aspect as would be appreciated to one skilled in the art.

The present disclosure provides the implementation of a system that uses a hard disk 27, a removable magnetic disk 29 and/or a removable optical disk 31, but it should be understood that it is possible to employ other types of computer information media 56 which are able to store data in a form readable by a computer (solid state drives, flash memory cards, digital disks, random-access memory (RAM) and so on, locally and/or remotely), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, other computer systems, and so on. Such input devices usually plug into the computer system 20 through a serial port 46, which in turn is connected to the system bus, but they can be connected in other ways, for example, with the aid of a parallel port, a game port, a universal serial bus (USB), a wired network connection, or wireless data transfer protocol. A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49, which can correspond to the remote viewing devices, i.e., the IP connected device (e.g., a smartphone, tablet, personal computer, laptop, media display device, or the like). Other devices can also be present in the computer network, such as routers, network stations, peer devices or other network nodes.

Network connections 50 can form a local-area computer network (LAN), such as a wired and/or wireless network, and a wide-area computer network (WAN). Such networks are used in corporate computer networks and internal company networks, and they generally have access to the Internet. In LAN or WAN networks, the personal computer 20 is connected to the network 50 across a network adapter or network interface 51. When networks are used, the personal computer 20 can employ a modem 54 or other modules for providing communications with a wide-area computer network such as the Internet or the cloud. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general-purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goal(s), and that these specific goal(s) will vary for different implementations and different developers. It will be appreciated that such a development effort might be complex and time-consuming but would nevertheless be a routine undertaking of engineering for those of ordinary skill in the art having the benefit of this disclosure.

It is noted that terms "compromises," "comprising," "includes," "including," "has," "having" or any other variation thereof, are intended to cover a non-exclusive inclusion. For example, a process, system, method, article, or apparatus that comprises a list of elements is not necessarily limited to only those elements but may include other elements not expressly listed or inherent to such processes, systems methods, articles, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Furthermore, as used herein any reference to "one embodiment" or "an embodiment" indicates that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate additional alternative systematic and functional designs. Thus, while particular embodiments and applications have been illustrated and described herein, it is to be understood that the disclosed embodiments are not limited to the precise construction and components disclosed herein. Various modifications, changes, and variations, which will be apparent to those skilled in the art, may be made in the arrangement, operation, and details of the system and method disclosed herein without departing from the spirit and scope defined in the claims.

Furthermore, it is to be understood that the phraseology or terminology used herein is for the purpose of description and not of restriction, such that the terminology or phraseology of the present specification is to be interpreted by those skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A system for calculating compensation associated with achieving at least one set of brand promotion goals through the use of at least one set of media content that contains at least one set of natural promotional elements while minimizing resource consumption, the system comprising:

at least one electronic database configured to store information related to at least one set of advertiser requested natural promotion elements in at least one set of media content;

at least one electronic database configured to store at least one set of media content;

at least one processor with software instructions stored therein that, when executed by the at least one processor, configure the at least one processor to execute:

(i) at least one media content analysis processor which is configured to analyze at least one set of media content to identify the sentiment of at least one set of natural promotion elements, wherein sentiment analysis evaluates a plurality of parameters including expressions and micro-expressions, pupil dilation, nostril flaring, eyebrow movement, and vocal tone, pitch, pace, pauses including placement of pauses and phrasing, to assess the naturalness, authenticity, and honesty of the presentation and to recognize feelings including honest, natural, organic, authentic, and sincere;

(ii) the at least one media content analysis processor which is configured to match at least one advertiser requested sentiment of at least one natural promotion element with at least one identified natural promotion element with at least one identified sentiment of at least one natural promotion element in at least one media content set;

(iii) at least one media content distribution rules engine configured to identify at least one distribution platform to transmit at least one media content set that contains at least one identified natural promotion element that matches at least one advertiser requested sentiment, wherein the rules include limiting playout rights including play or not play and only play certain sections, and take into consideration the network over which the media content is distributed including unlimited home Wi-Fi or pay-per-bit delivered mobile networks, and high bandwidth or low bandwidth networks, and the technical ability of a playout device, wherein the media content distribution rules engine omits transmission of nonqualifying sections of the at least one media content set;

(iv) at least one server configured to transmit at least one media content set towards a distribution platform;

(v) at least one media content distribution analysis processor which is configured to analyze the distribution of the at least one media content set, including keeping track of viewing bit rate, viewing resolution, the portion of the content that was distributed, and complete views, partial views, skips, view time, pauses, fast forwards, replays; and (vi) at least one processor configured to calculate the compensation related to the distribution of the at least one media content set, based at least in part on the duration and proportion of authentically natural sentiment as determined by the media content analysis processor within the at least one media content set; wherein the system is configured to utilize artificial intelligence and machine learning systematic approaches to increase the efficiency and performance of the system, improving quality while reducing distribution server time, reducing network delivery bandwidth, associated energy, consumer time, and use of other system resources, and wherein, based on the analysis of the distribution including metadata, the system is configured to alter and refine remaining media content such that over time the media content at a given time is different than the media content that was initially created.

2. The system according to claim 1, wherein at least one media content business rules and goals processor is configured to provide at least one set of instructions for the creation of at least one set of new media content based on at least one historical result of the distribution of at least one media content set that contained natural promotion elements in media content.

3. The system according to claim 1, wherein the at least one set of media content is video with audio.

4. The system according to claim 1, wherein the at least one set of media content is video.

5. The system according to claim 1 wherein the at least one set of media content is audio.

6. The system of claim 1, wherein the media content distribution rules engine omits transmission of sections that do not satisfy the advertiser-requested sentiment, and the media content distribution analysis processor records the portion of the content that was distributed.

7. The system of claim 1, wherein device capability comprises at least one of a speaker, an HD, 4K, 8K display, or a VR headset.

* * * * *